(12) United States Patent
Driskell (10) Patent No.: US 11,788,240 B2
(45) Date of Patent: Oct. 17, 2023

(54) CONVEYOR MOLD SYSTEM FOR SLIP FORMING A CONCRETE BARRIER

(71) Applicant: Blake Driskell, Jackson, MO (US)

(72) Inventor: Blake Driskell, Jackson, MO (US)

(*) Notice: Subject to any disclaimer, the term of this patent is extended or adjusted under 35 U.S.C. 154(b) by 689 days.

(21) Appl. No.: 16/994,803

(22) Filed: Aug. 17, 2020

(65) Prior Publication Data
US 2022/0049437 A1    Feb. 17, 2022

(51) Int. Cl.
*E01C 19/48* (2006.01)
*E04G 11/22* (2006.01)
*B65G 41/00* (2006.01)

(52) U.S. Cl.
CPC ........ *E01C 19/4893* (2013.01); *B65G 41/008* (2013.01); *E04G 11/22* (2013.01); *B65G 2201/04* (2013.01); *E01C 2301/02* (2013.01)

(58) Field of Classification Search
CPC . E01C 19/4893; E01C 2301/02; E04G 11/22; B65G 41/008; B65G 2201/04
USPC ...................................................... 404/89, 93
See application file for complete search history.

(56) References Cited

U.S. PATENT DOCUMENTS

| | | | |
|---|---|---|---|
| 3,685,405 A | 8/1972 | McDonald et al. | |
| 3,832,079 A | 8/1974 | Moorhead | |
| 4,266,917 A | 5/1981 | Godbersen | |
| 5,290,492 A | 3/1994 | Belarde | |
| 5,318,426 A | 6/1994 | Hanson et al. | |
| 5,354,189 A | 10/1994 | McKinnon | |
| 5,533,888 A | 6/1996 | Belarde | |
| 5,616,291 A | 4/1997 | Belarde | |
| 6,923,630 B2 * | 8/2005 | Allen | E01C 19/4893 425/363 |
| 8,317,502 B1 | 11/2012 | Grey | |
| 11,161,793 B2 * | 11/2021 | Sanford | B05B 16/80 |
| 2003/0020191 A1 | 1/2003 | Allen | |
| 2004/0247390 A1 * | 12/2004 | Smith | B28B 11/0818 404/93 |
| 2005/0238745 A1 | 10/2005 | Allen | |

* cited by examiner

*Primary Examiner* — Raymond W Addie
(74) *Attorney, Agent, or Firm* — David H. Chervitz (57) ABSTRACT

A conveyor mold system for slip forming a concrete barrier has a concrete paving machine having a main frame having machine legs and machine tracks, an auger system for receiving concrete, a barrier paving mold having a hopper for receiving concrete from the auger system, a conveyor assembly main frame having a front roller and a rear roller, and a belt having a pattern with the belt positioned on the front roller and the rear roller.

20 Claims, 6 Drawing Sheets

CONVEYOR MOLD SYSTEM FOR SLIP FORMING A CONCRETE BARRIER

BACKGROUND

This disclosure relates to concrete forming machinery more particularly to a conveyor mold system for slip forming a concrete barrier with a reproducible pattern along the length of the formed concrete barrier.

Slip forming is a construction method in which concrete is poured into a continuously moving form to manufacture a continuous, non-interrupted, cast-in-place concrete structure. Slip formed structures are strong, durable, and resistant to wear and tear. Slip forming is the fastest method of constructing repetitive concrete structures, saving cost and time. In recent years there has been an increasing desire to be able to incorporate aesthetic details or designs into construction projects. As budgets allow, aesthetic details have been designed in various parts of structures such as lighting features on roadways, railings along sidewalks and walking trails, designs in bridge columns, designs in concrete barrier walls, and many other features to enhance the visual appearance of projects. However, being able to produce a concrete structure having aesthetic designs incorporated therein presents significant problems for contractors.

A standard concrete barrier wall formed using the slip forming process having no aesthetic details can be manufactured at a rate of approximately 125 linear feet per hour. When aesthetic details are incorporated into the design, slip forming is typically not an option. In order to accomplish this, contractors use traditional methods of building forms, inserting form liners in the forms to produce the desired aesthetic details, and pouring concrete into the forms. When this traditional method is used only approximately 100 linear feet per day can be completed. As can be appreciated, this drastic decrease in production results in significant costs increases for the contractors, delays in completing the project, and the potential for damages due to contractual obligations in constructing the project.

In an attempt to overcome these problems, there is one known slip forming apparatus hat is capable of imprinting a design into the concrete. However, this known slip forming apparatus is fraught with serious problems. In particular, the apparatus has a single roller apparatus that is mounted at the back end of the machine. The roller apparatus includes a pattern on the exterior surface of the roller with the pattern being used to incorporate a design into a concrete barrier. Concrete is supplied to the machine from a dump truck or a ready mix truck. The concrete is transferred to a paving mold and then vibrated extensively to produce a concrete structure in the shape of the paving mold. After the fresh concrete is formed into the concrete structure, the roller apparatus has pressure applied to it by use of a turnbuckle device to make pattern on the roller apparatus contact the concrete structure. The pattern on the exterior surface of the roller apparatus is impressed into the concrete structure as the slip forming machine proceeds or moves in a forward direction of travel. Although this slip forming apparatus may reduce the time a concrete structure having a design is formed over the traditional method, the following problems are associated with its use. One problem is that the pattern is impressed into the concrete for a minimal amount of time before the roller apparatus moves forward or is rolled off of the concrete. The rolling off nature of the roller apparatus makes it difficult to slip form walls or structures with designs that have crisp edges. Due to the roller apparatus being positioned beyond the rear limits of the paving mold, the desired design is not imprinted upon initial setting of the concrete. Since the design is imprinted after the concrete structure is extruded from the paving mold, inconsistencies often occur with the contrast and finish of the design in the concrete structure. If the design is not consistently impressed into the concrete structure then the contractor will have to manually go back over the muddled design to fix the design. This adds time and cost to completing the project. The roller apparatus requires that pressure on the roller be manually adjusted by trial and error adjustment of the turnbuckle device which ensures that pressure is not uniformly, constantly, or equally distributed across the surface of the concrete. Also, due to the location the pressure is applied from the roller apparatus to the extruded concrete structure there is inadequate support which can cause the concrete structure to be displaced, deformed, or fail. For example, the slip formed concrete structure may be squeezed by the roller apparatus causing the top width of the structure to decrease which increases the height of the structure which can cause the top of the structure to crack. As can be appreciated, this causes the concrete structure to fail which results in the structure having to be formed again. This adds to the costs in constructing the structure and delays completion of the project which could result in the contractor paying damages for the delays.

One common problem for concrete paving contractors is inconsistency of the slump of the concrete being delivered to the project. Slump is a measurement of the consistency of concrete. In other words, it measures how easy the concrete is to push, mold, and smooth out. The higher the slump, the more workable the concrete. If the slump of concrete is too low then the concrete will not shape very easily. If the slump is too high then the concrete may be unusable. With the inconsistencies in the slump, this creates a need to constantly vary the amount of pressure applied to the roller apparatus. This is difficult to accomplish for the following reasons. If the first ready mix truck on the job site delivers concrete with a one inch slump then the roller apparatus needs to be adjusted to apply significant pressure to the concrete structure to ensure that the design is impressed to the desired contrast. If the second ready mix truck then delivers concrete with a two inch slump then the roller apparatus then the roller apparatus needs to be adjusted to compensate for the change in slump. If the pressure is not properly adjusted then the concrete structure may have a deeper impression of the pattern which creates a very inconsistent and undesirable appearance. The contractor would then be forced to repair the concrete structure which adds time and cost to the project. Therefore, there is a need for an improved slip forming machine that can consistently impress a pattern into a concrete structure or barrier.

In view of the above recited problems, it would be desirable to have a conveyor mold system for slip forming a concrete barrier that is capable of imprinting any design into the concrete barrier. It would further be advantageous to have a conveyor mold system for slip forming a concrete barrier that can increase the rate at which a concrete barrier is slip formed when producing a design into the barrier. It would also be advantageous to have a conveyor mold system for slip forming a concrete barrier that may be easily used by a contractor to incorporate a design into the concrete barrier which does not require any special tooling, experience, or increased labor.

SUMMARY

In one form of the present disclosure, a conveyor mold system for slip forming a concrete barrier is disclosed which comprises a concrete paving machine having a main frame having machine legs and machine tracks, an auger system for receiving concrete, a barrier paving mold having a hopper for receiving concrete from the auger system, a conveyor assembly main frame having a front roller and a rear roller, and a belt having a pattern with the belt positioned on the front roller and the rear roller In another form of the present disclosure, a conveyor mold system for slip forming a concrete barrier comprises a concrete paving machine having a main frame having machine legs and machine tracks, an auger system for receiving concrete, a barrier paving mold having a hopper for receiving concrete from the auger system, a conveyor assembly main frame having a front roller and a rear roller, a belt having a pattern with the belt positioned on the front roller and the rear roller, and a motor having a shaft positioned on the rear roller.

In yet another form of the present disclosure, a conveyor mold system for slip forming a concrete barrier comprises a concrete paving machine having a main frame having machine legs and machine tracks, an auger system for receiving concrete, a barrier paving mold having a hopper for receiving concrete from the auger system, a conveyor assembly main frame having a front roller and a rear roller, a belt having a pattern with the belt positioned on the front roller and the rear roller, and an assembly support positioned within the conveyor assembly main frame for preventing the belt from sagging during use.

In light of the foregoing comments, it will be recognized that the present disclosure provides a conveyor mold system for slip forming a concrete barrier with a reproducible pattern along the length of the concrete barrier.

The present disclosure provides a conveyor mold system for slip forming a concrete barrier with a reproducible pattern along the length of the concrete barrier with the pattern being a custom pattern or a standard pattern.

The present disclosure provides a conveyor mold system for slip forming a concrete barrier which reduces time, labor, and cost in forming a concrete barrier along a roadway.

The present disclosure provides a conveyor mold system for slip forming a concrete barrier which can reproduce any pattern along the length of the concrete barrier.

The present disclosure is also directed to a conveyor mold system for slip forming a concrete barrier having a multitude of reproducible patterns that may be formed seamlessly in the concrete barrier along the length of the concrete barrier.

The present disclosure also provides for a conveyor mold system for slip forming a concrete barrier that has a number of interchangeable belts having different patterns that may be used to impress a pattern into the concrete barrier along the length of the concrete barrier.

The present disclosure is further directed to a conveyor mold system for slip forming a concrete barrier having a motor to synchronize with the speed of a slip forming machine for impressing a pattern into the concrete barrier at the same speed as that of the slip forming machine.

The present disclosure provides a conveyor mold system for slip forming a concrete barrier which may be constructed of readily available parts and which can be easily employed with highly reliable results.

The present disclosure also provides a conveyor mold system for slip forming a concrete barrier that is easy to handle, easy to install, and easy to use in forming a concrete barrier with a pattern along the entire length of the concrete barrier.

The present disclosure further provides a conveyor mold system for slip forming a concrete barrier that has one or more supports for preventing a belt having a pattern thereon from sagging during forming of the concrete barrier.

The present disclosure is also directed to a conveyor mold system for slip forming a concrete barrier which has interchangeable belts having different patterns with the belts being easy to remove or install on the conveyor mold system.

The present disclosure is further directed to a conveyor mold system for slip forming a concrete barrier which consistently impresses a pattern into the concrete barrier as the concrete barrier is being molded.

The present disclosure provides a conveyor mold system for slip forming a concrete barrier that has a belt having a pattern with the belt being reinforced or strengthened for preventing the belt from wearing out during use.

The present disclosure also provides a conveyor mold system for slip forming a concrete barrier that has a belt having a pattern incorporated into one side of the belt and another side having structure to hold the belt in an upright position during use.

These and other advantages of the present conveyor mold system for slip forming a concrete barrier will become apparent after considering the following detailed specification in conjunction with the accompanying drawings, wherein:

DETAILED DESCRIPTION OF A PREFERRED EMBODIMENT

Figure 1:
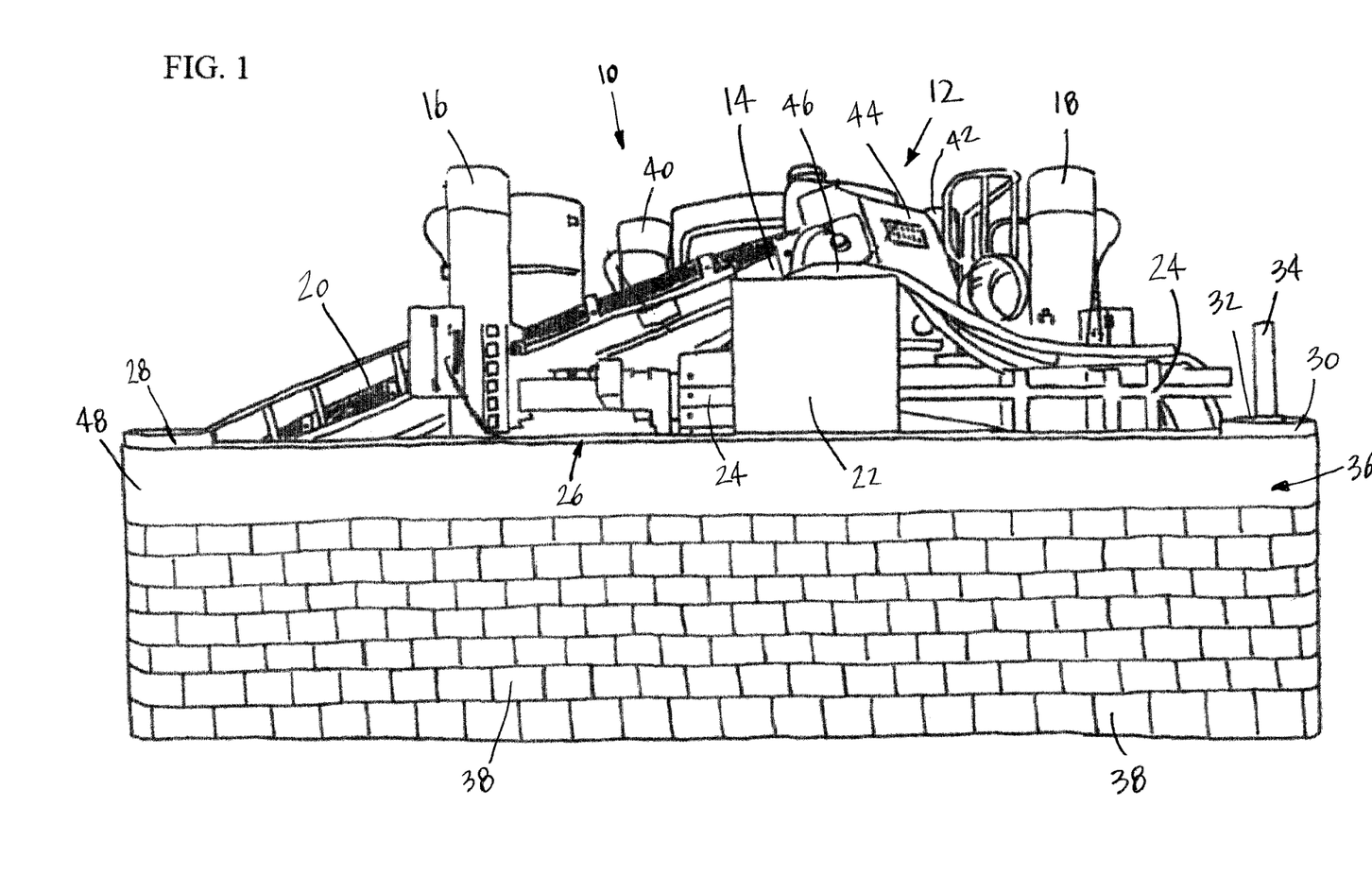
FIG. 1 is a back side view of a conveyor mold system for slip forming a concrete barrier constructed according to the present disclosure.

Referring now to the drawings, wherein like numbers refer to like items, number 10 identifies a conveyor mold system for slip forming a concrete barrier constructed according to the present disclosure. With reference now to FIG. 1, the conveyor mold system for slip forming a concrete barrier 10 is shown to comprise a concrete paving machine 12 having a main frame having 14 having a left front machine leg 16 and a left rear machine leg 18. The machine 12 also has an auger system 20 for receiving concrete (not shown) from a ready mix truck (not shown) that moves the concrete through the auger system 20 to a hopper 22. The hopper 22 feeds the concrete to a barrier paving mold 24 that is used to form the concrete into a structure, such as a concrete barrier. The machine 12 also has a conveyor assembly main frame 26 having a front roller 28 and a rear roller 30. The rear roller 30 may have a motor 32 having a shaft 34 mounted to the rear roller 30 for rotating the rear roller 30 at a specific rate of rotation. The motor 32 may be hydraulically driven where the motor 32 can be tied to a hydraulic drive system (not shown) associated with the machine 12. A belt 36 having a pattern 38, such as a brick like pattern, is positioned on or around the front roller 28 and the rear roller 30. The belt 36 may be a continuous belt that provides a continuous pattern, such as the pattern 38. Tying rotation of the motor 32 into the movement of the machine 12 ensures that the belt 36 will move or rotate at exactly the same speed as the machine 12. The belt 36 will also be able to start rotating and stop rotating at exactly the same times as the machine 12 starts or stops movement. This prevents the belt 36 and the pattern 38 from dragging or disfiguring the concrete when the machine 12 is in operation. The motor 32 may also be an electronically driven motor having a gear system to prevent any dragging of the belt 36 and the pattern 38 over the concrete. The belt 36 has a height and the height of the belt 36 is larger than the height of the structure to be formed. In essence, the height of the structure to be formed is the height of the pattern 38.

The machine 12 also has a right front leg 40 and a right rear leg 42. An operator's station 44 is also provided on the machine 12 for allowing an operator to ride along in the machine 12 to control and operate the machine 12. A vibrator unit 46 may also be part of the hopper 22 and the unit 46 is used to agitate or consolidate the concrete prior to the concrete being formed into a barrier or structure by the paving mold 24. Although one vibrator unit 46 is described, it is known that more than one vibrator unit may be present in the machine 12. Also, the vibrator unit 46 may be a hydraulic unit. The belt 36 also has a top upper border section 48 that is void of any of the pattern 38. The pattern 38 and the section 48 may comprise the height of the concrete barrier that is formed. The section 48 is used to provide a smooth upper border into the concrete when forming the concrete barrier. As can be appreciated, the machine 12 is used to form a concrete barrier by having concrete fed into the paving mold 24 from the hopper 22 and the auger system 20. Once in the hopper 22, the vibrator unit 46 vibrates the concrete to remove any voids or air pockets. As the concrete is being formed into a barrier by use of the slip forming method the pattern 38 on the belt 36 is being pressed into the concrete on one side of the barrier or structure to form an aesthetic design into the concrete. In this particular example, a brick like pattern will be formed into the concrete barrier. In essence, one side of the finished concrete barrier will appear to be constructed of bricks instead of plain concrete.

Figure 2:
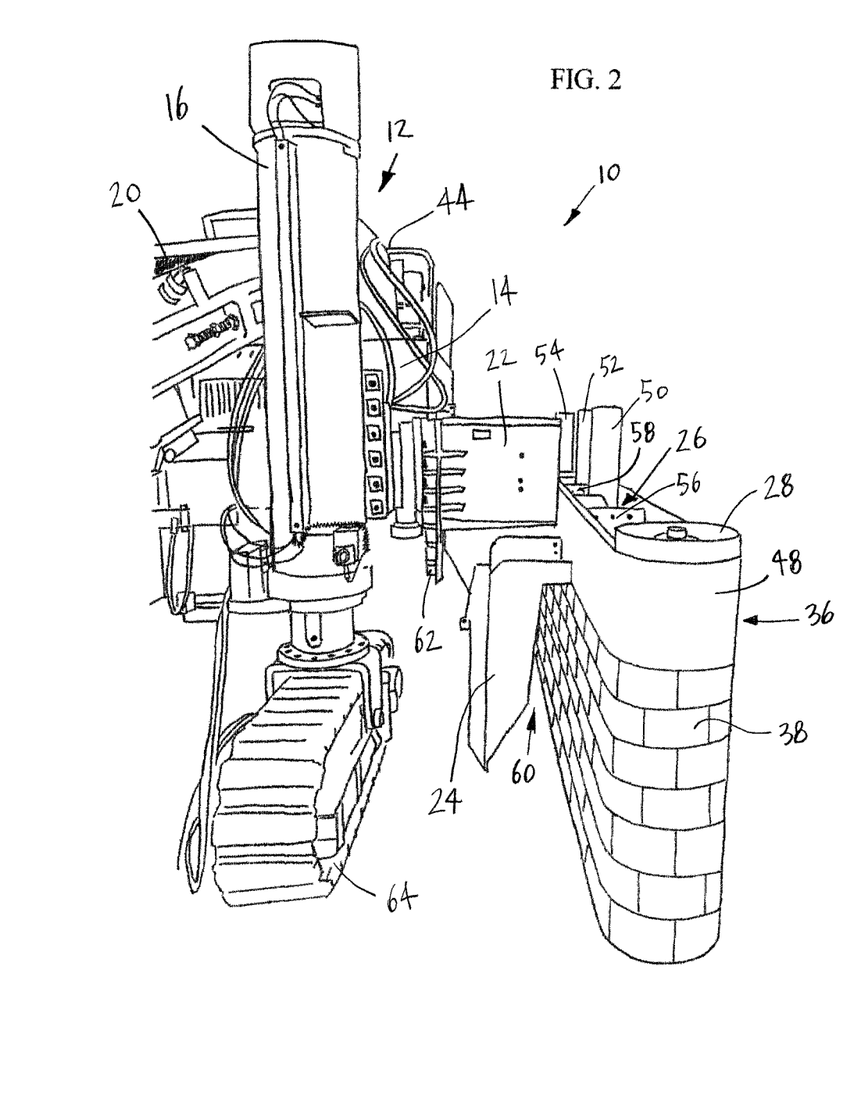
FIG. 2 is a partial front view of the conveyor mold system for slip forming a concrete barrier constructed according to the present disclosure.

FIG. 2 illustrates a partial front view of the conveyor mold system for slip forming a concrete barrier 10. The system 10 is shown having the conveyor assembly main frame 26 having the belt 36 being positioned on the front roller 28. The belt 36 has the pattern 38 and the section 48. The conveyor assembly main frame 26 has supports 50, 52, and 54 and mounts 56 and 58. The supports 50, 52, and 54 and the mounts 56 and 58 are used to prevent any deformation of the frame 26 and to allow the frame 26 to withstand any increased forces associated with forming the concrete barrier. As will be explained in further detail herein, there may be more supports 50, 52, and 54 and more mounts 56 and 58 used to prevent deformation. The barrier paving mold 24 is constructed into a desired shape of the concrete structure to be formed. The barrier paving mold 24 has a space 60 in which concrete will be positioned to form the concrete into the particular desired shape of the barrier or structure. The pattern 38 of the belt 36 is continuously being presented to the concrete which fills the space 60. In this manner, the pattern 38 will be imprinted or impressed into one side of the concrete formed in the space 60. A mold mount 62 connects the paving mold 24 and the conveyor assembly main frame 26 to the main frame 14 of the machine 12. The left front leg 16 is also shown having a machine track 64 that is used to move the machine 12 when in operation. Although only the machine track 64 is shown in this particular view, it is to be understood that there is a machine track associated with each of the other legs 18, 40, and 42 (FIG. 1). In this manner, the machine 12 is able to move or crawl when forming the concrete barrier. As has been indicated, the motor 32 (FIG. 1) may be synchronized to the rate that the machine tracks move to be able to imprint the pattern 38 at the same rate as the rate that the concrete barrier is being formed. The auger system 20, the hopper 22, and the operator's station 44 are also shown in this particular view.

Figure 3:
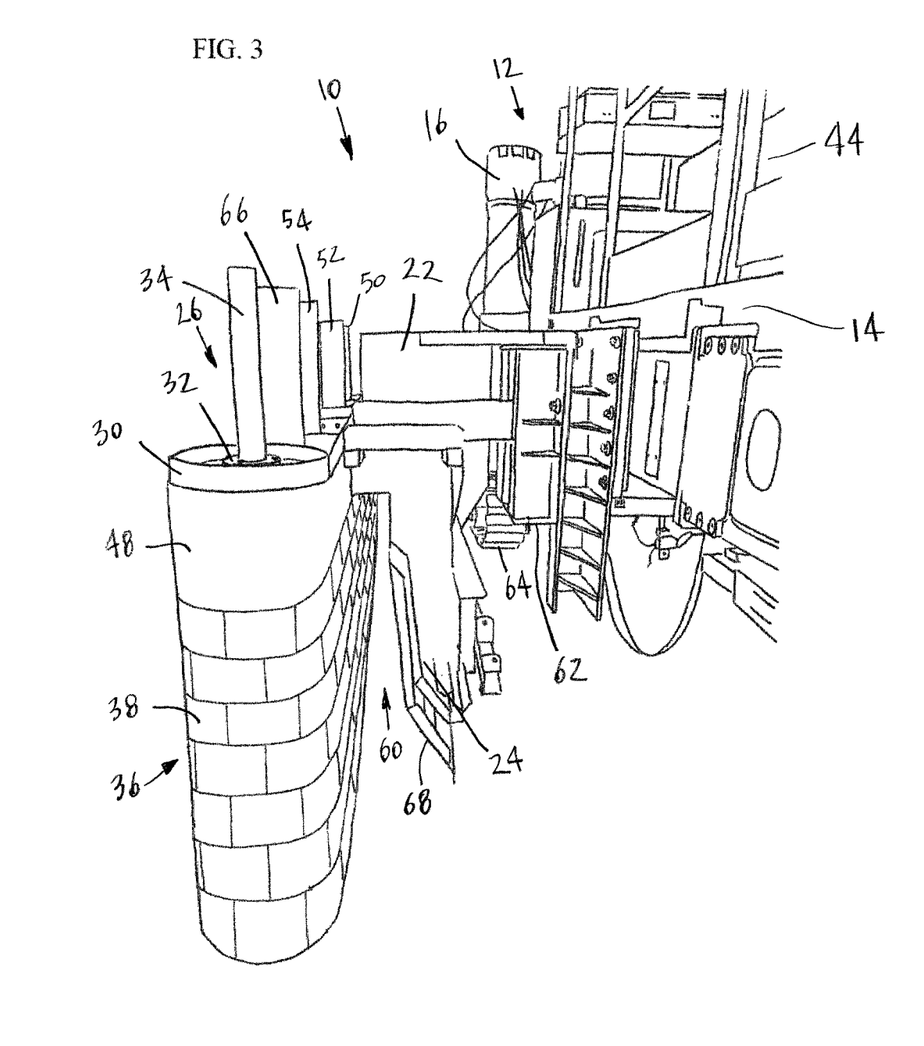
FIG. 3 is a partial rear view of the conveyor mold system for slip forming a concrete barrier constructed according to the present disclosure.

With reference now to FIG. 3, a partial rear view of the conveyor mold system for slip forming a concrete barrier 10 constructed according to the present disclosure is depicted. The system 10 is shown with the machine 12 having the conveyor assembly main frame 26 having the belt 36 being positioned on the rear roller 30. The rear roller 30 has the motor 32 and the shaft 34 mounted thereto. The belt 36 has the pattern 38 and the section 48. The conveyor assembly main frame 26 has supports 50, 52, 54, and 66. The paving mold 24 has the space 60 which is the particular desired shape of the concrete structure to be formed. The paving mold 24 has a front face 68 which is used to form the concrete structure having a side that does not have a design impressed into the side. The pattern 38 of the belt 36 is continuously being presented to one side of the concrete which fills the space 60. In this manner, the pattern 38 will be imprinted into one side of the concrete formed in the space 60. A mold mount 62 connects the paving mold 24 and the conveyor assembly main frame 26 to the main frame 14 of the machine 12. The left front leg 16 is also shown having the machine track 64 that is used to move the machine 12 when in operation. The hopper 22 and the operator's station 44 are also shown.

Figure 4:
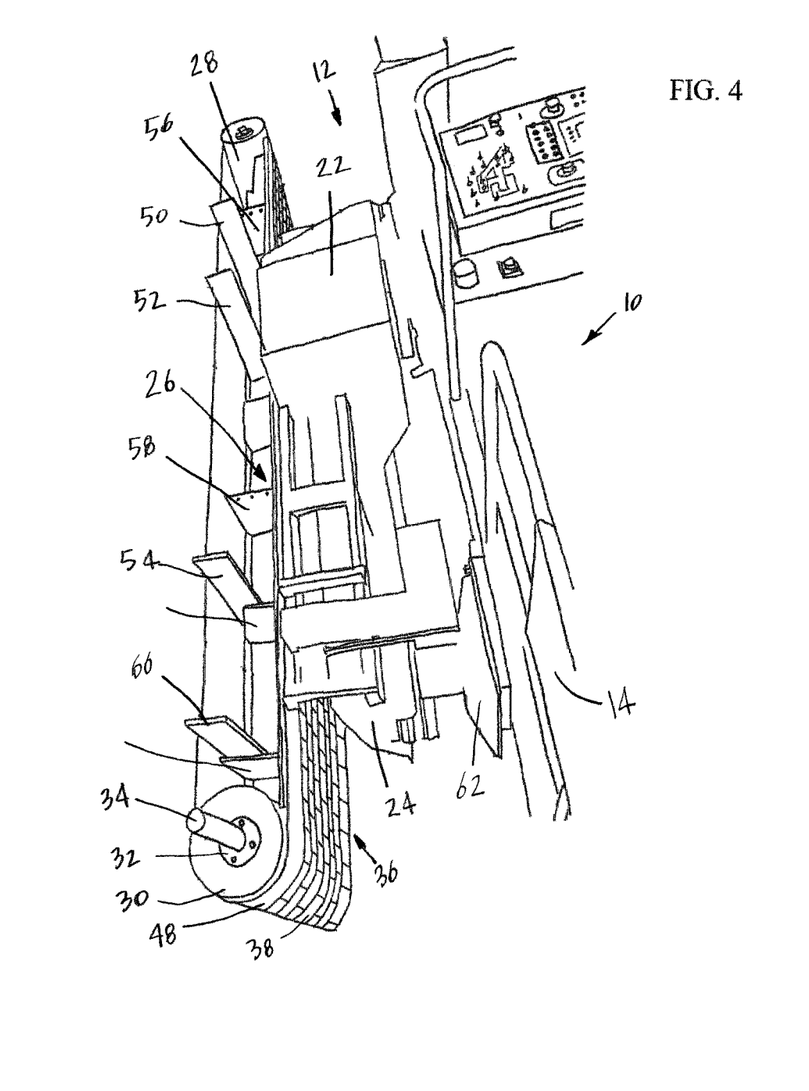
FIG. 4 is a partial overhead view of the conveyor mold system for slip forming a concrete barrier constructed according to the present disclosure.

FIG. 4 shows a partial overhead view of the conveyor mold system for slip forming a concrete barrier 10. The system 10 has the conveyor assembly main frame 26 having the belt 36 being positioned on the front roller 28 and the rear roller 30. The rear roller 30 has the motor 32 and the shaft 34 mounted thereto. The belt 36 has the pattern 38 and the section 48. The conveyor assembly main frame 26 has supports 50, 52, 54, and 66 and the mounts 56 and 58. The mold mount 62 connects the paving mold 24 and the conveyor assembly main frame 26 to the main frame 14 of the machine 12. The hopper 22 and the paving mold 24 are also depicted.

Figure 5:
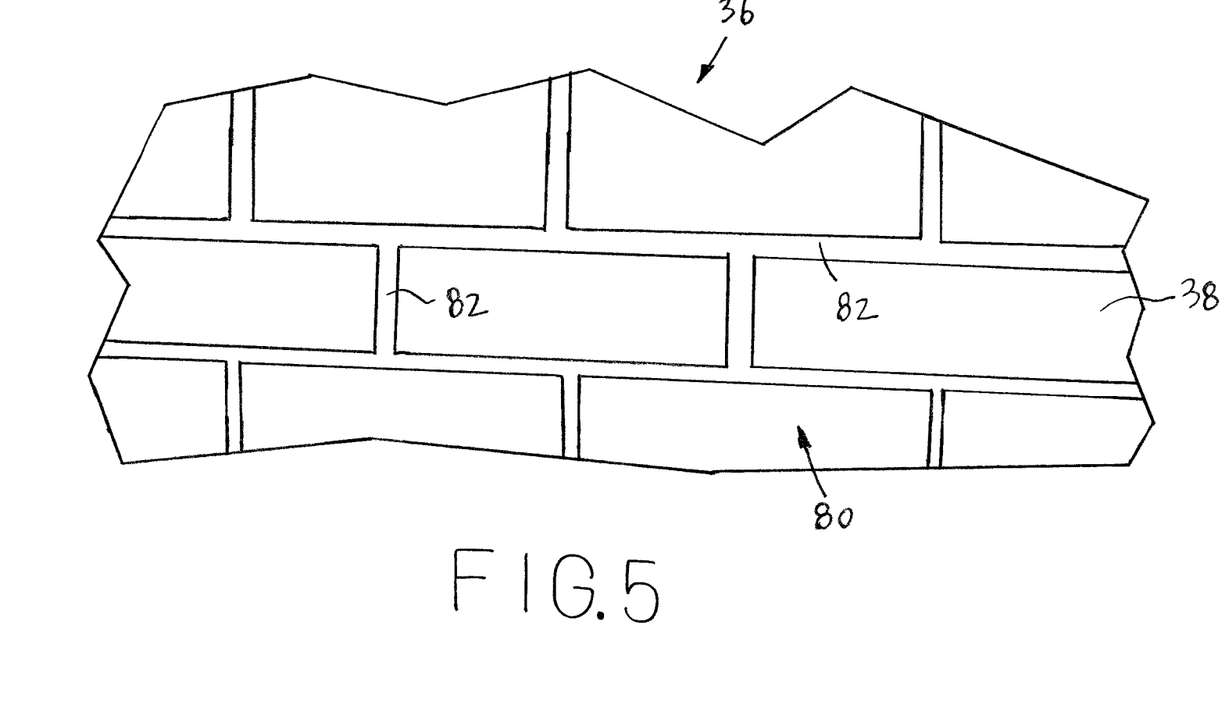
FIG. 5 is a partial front perspective view of a belt having a pattern for use with the conveyor mold system for slip forming a concrete barrier constructed according to the present disclosure.

Referring now to FIG. 5, a partial front perspective view of the belt 36 having the pattern 38 for use with the conveyor mold system for slip forming a concrete barrier 10 is shown. The pattern 38 may be formed by creating a template mold that would allow pouring of a two part liquid rubber, such as an elastomeric rubber, on a rubber conveyor belt, such as the belt 36. The two part liquid rubber would be allowed to cure to adhere the liquid rubber to the belt 36. A reverse pattern from the template mold would be exposed on an exterior side 80 of the belt 36. The pattern 38 is a brick like pattern having mortar lines 82 that extend out from the exterior side 80. By extending out, the mortar lines 82 will extend into the concrete so that the pattern 38 is imprinted into the concrete.

The pattern 38 may also be formed by designing the pattern 38 integral with the belt 36 during formation of the belt 36. As can be appreciated, any pattern may be formed and be made part of the belt 36. The pattern may be a standard pattern, such as the depicted brick like pattern, or the pattern may be custom made for the project. The belt 36 having the pattern 38 may be removed from the conveyor assembly main frame 26 by loosening the tension of either or both of the rollers 28 and 30. Once removed, another belt having a different pattern than the pattern 38 may be inserted over the rollers 28 and 30, the rollers 28 and 30 tightened, and then the different pattern may be imprinted into a concrete structure.

Figure 6:
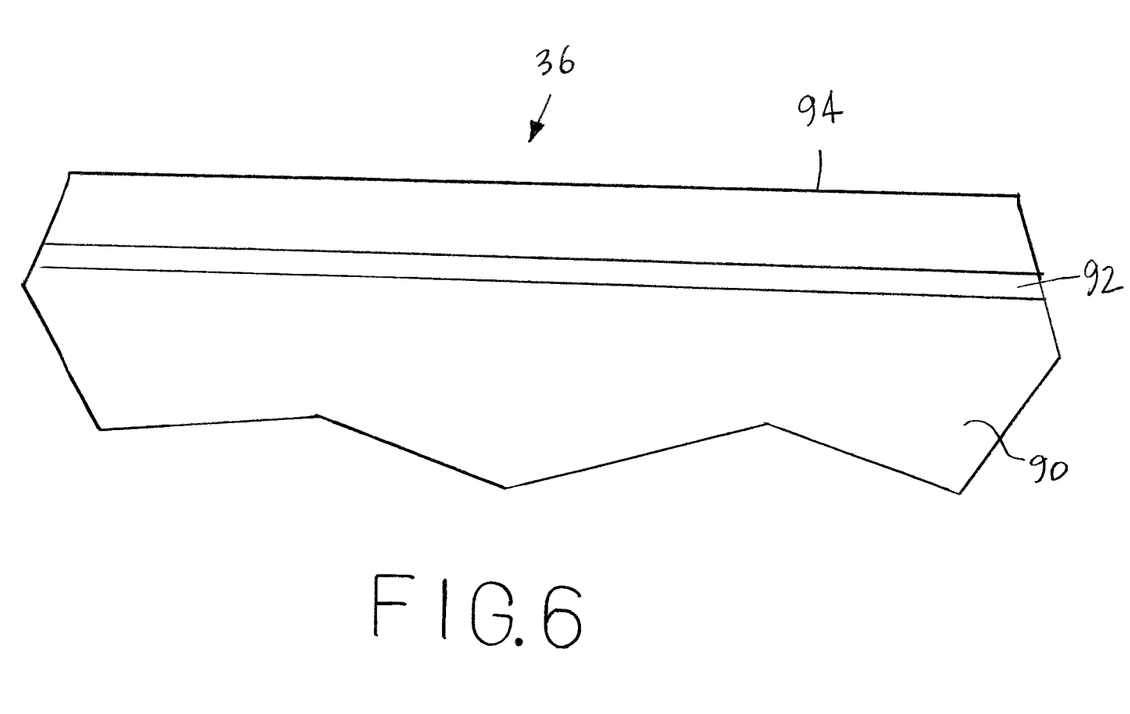
FIG. 6 is a partial rear perspective view of the belt shown in FIG. 5 having a support structure incorporated into the belt for preventing sagging of the belt when the belt is installed on the conveyor mold system for forming a concrete barrier constructed according to the present disclosure.

FIG. 6 illustrates a partial rear perspective view of the belt 36. The belt 36 has an interior side 90 which has a groove or channel 92 formed therein. The groove 92 fits into a corresponding track (not shown) on the conveyor assembly main frame 26. The groove 92 and the track are used to prevent the belt 36 from sagging during use. The belt 36 also has an upper portion or edge 94. The section 48 (FIG. 1) on the opposite side exterior side 80 (FIG. 5) may be where the groove 92 is formed in the belt 36. Although the groove 92 is depicted in a horizontal orientation, it is possible that the groove 92 may be vertical and there may be more grooves formed along the belt 36. It is also contemplated that the belt 36 may have a backing, such as canvas, to further strengthen the belt 36 and reduce any fiction as the belt 36 rotates. Other materials, such as ultra-high molecular weight polyethylene sheets may be used to lower friction to allow the motor 32 to operate with less stress.

From all that has been said, it will be clear that there has thus been shown and described herein a conveyor mold system for slip forming a concrete barrier which fulfills the various advantages sought therefore. It will become apparent to those skilled in the art, however, that many changes, modifications, variations, and other uses and applications of the subject conveyor mold system for slip forming a concrete barrier are possible and contemplated. All changes, modifications, variations, and other uses and applications which do not depart from the spirit and scope of the disclosure are deemed to be covered by the disclosure, which is limited only by the claims which follow.

What is claimed is:

1. A conveyor mold system for slip forming a concrete barrier comprising:
    a concrete paving machine having a main frame having machine legs and machine tracks;
    an auger system for receiving concrete;
    a barrier paving mold having a hopper for receiving concrete from the auger system;
    a conveyor assembly main frame having a front roller and a rear roller, and a support for preventing any deformation of the conveyor assembly main frame;
    a mold mount connecting the barrier paving mold and the conveyor assembly main frame to the main frame of the concrete paving machine; and
    a belt having a pattern with the belt positioned on the front roller and the rear roller and against the conveyor assembly main frame.

2. The conveyor mold system for slip forming a concrete barrier of claim 1 further comprising a second belt having a pattern different than the pattern of the belt with the second belt being positioned on the front roller and the rear roller when the belt is removed from the front roller and the second roller.

3. The conveyor mold system for slip forming a concrete barrier of claim 1 wherein the belt is a continuous belt that is capable of rotating on the front roller and the rear roller.

4. The conveyor mold system for slip forming a concrete barrier of claim 1 wherein the belt has a height and the formed concrete barrier has a height with the height of the belt being greater than the height of the formed concrete barrier.

5. The conveyor mold system for slip forming a concrete barrier of claim 1 wherein the belt has an interior surface and a groove formed in the interior surface of the belt.

6. The conveyor mold system for slip forming a concrete barrier of claim 1 wherein the belt comprises an exterior surface having the pattern and a section that is void of any of the pattern.

7. The conveyor mold system for slip forming a concrete barrier of claim 1 wherein the pattern is formed from rubber.

8. A conveyor mold system for slip forming a concrete barrier comprising:
    a concrete paving machine having a main frame having machine legs and machine tracks;
    an auger system for receiving concrete;
    a barrier paving mold having a hopper for receiving concrete from the auger system;
    a conveyor assembly main frame having a front roller and a rear roller, and a first support, a second support, a third support, a first mount, and a second mount with the supports and the mounts for preventing any deformation of the conveyor assembly main frame;
    a mold mount connecting the barrier paving mold and the conveyor assembly main frame to the main frame of the concrete paving machine;
    a belt having a pattern with the belt positioned on the front roller and the rear roller and against the conveyor assembly main frame; and
    a motor having a shaft positioned on the rear roller.

9. The conveyor mold system for slip forming a concrete barrier of claim 8 wherein the machine tracks of the concrete paving machine move at a first rate and the motor moves at a second rate and the second rate is equal to the first rate.

10. The conveyor mold system for slip forming a concrete barrier of claim 8 wherein the motor moves the rear roller at a first rate.

11. The conveyor mold system for slip forming a concrete barrier of claim 8 further comprising a second belt having a pattern different than the pattern of the belt with the second belt being positioned on the front roller and the rear roller when the belt is removed from the front roller and the second roller.

12. The conveyor mold system for slip forming a concrete barrier of claim 8 wherein the belt is a continuous belt that is capable of rotating on the front roller and the rear roller.

13. The conveyor mold system for slip forming a concrete barrier of claim 8 wherein the belt has a height and the formed concrete barrier has a height with the height of the belt being greater than the height of the formed concrete barrier.

14. The conveyor mold system for slip forming a concrete barrier of claim 8 wherein the belt comprises an exterior surface having the pattern and a section that is void of any of the pattern.

15. A conveyor mold system for slip forming a concrete barrier comprising:
    a concrete paving machine having a main frame having machine legs and machine tracks;
    an auger system for receiving concrete;

a barrier paving mold having a hopper for receiving concrete from the auger system;

a conveyor assembly main frame having a front roller and a rear roller, a support, and a mount with the support and the mount for preventing any deformation of the conveyor assembly main frame;

a mold mount connecting the barrier paving mold and the conveyor assembly main frame to the main frame of the concrete paving machine; and a belt having a pattern with the belt positioned on the front roller and the rear roller and against the conveyor assembly main frame.

16. The conveyor mold system for slip forming a concrete barrier of claim 15 wherein the barrier paving mold has a front face.

17. The conveyor mold system for slip forming a concrete barrier of claim 15 wherein the pattern is a custom pattern.

18. The conveyor mold system for slip forming a concrete barrier of claim 15 wherein the pattern is a brick pattern.

19. The conveyor mold system for slip forming a concrete barrier of claim 15 further comprising a second belt having a pattern different than the pattern of the belt with the second belt being positioned on the front roller and the rear roller when the belt is removed from the front roller and the second roller.

20. The conveyor mold system for slip forming a concrete barrier of claim 15 wherein the belt is a continuous belt that is capable of rotating on the front roller and the rear roller.

* * * * *